US012595896B2

(12) United States Patent
Ray

(10) Patent No.: US 12,595,896 B2
(45) Date of Patent: Apr. 7, 2026

(54) LUMINAIRE WITH A ROTATING PATTERN BEAM

(71) Applicant: LUMASCAPE PTY LTD, Eight Mile Plains (AU)

(72) Inventor: Aurelien Simon Claude Ray, Thorneside (AU)

(73) Assignee: LUMASCAPE PTY LTD, Eight Mile Plains (AU)

( * ) Notice: Subject to any disclaimer, the term of this patent is extended or adjusted under 35 U.S.C. 154(b) by 68 days.

(21) Appl. No.: 18/453,751

(22) Filed: Aug. 22, 2023

(65) Prior Publication Data

US 2024/0068643 A1 Feb. 29, 2024

Related U.S. Application Data

(60) Provisional application No. 63/400,342, filed on Aug. 23, 2022.

(51) Int. Cl.

| | |
|---|---|
| ***F21V 14/02*** | (2006.01) |
| ***F21V 21/30*** | (2006.01) |
| *F21V 21/15* | (2006.01) |
| *F21Y 115/10* | (2016.01) |

(52) U.S. Cl.

CPC .............. *F21V 14/02* (2013.01); *F21V 21/30* (2013.01); *F21V 21/15* (2013.01); *F21Y 2115/10* (2016.08)

(58) Field of Classification Search

CPC .......... F21V 14/02; F21V 21/30; F21V 21/15; F21Y 2115/10

USPC ........................................................... 362/35

See application file for complete search history.

(56) References Cited

U.S. PATENT DOCUMENTS

| | | | | |
|---|---|---|---|---|
| 10,718,507 | B2 * | 7/2020 | Potucek | F21S 8/00 |
| 2005/0057941 | A1 * | 3/2005 | Pederson | F21S 10/06 362/542 |
| 2005/0276044 | A1 * | 12/2005 | Mateescu | F21V 31/00 362/231 |
| 2018/0231199 | A1 * | 8/2018 | Chien | F21V 17/02 |
| 2021/0023466 | A1 * | 1/2021 | Mcdonald | A63H 3/36 |

* cited by examiner

*Primary Examiner* — Tracie Y Green
*Assistant Examiner* — Hana S Featherly
(74) *Attorney, Agent, or Firm* — KNOBBE, MARTENS, OLSON & BEAR, LLP

(57) ABSTRACT

Disclosed is a light fixture with a multi-piece drive gear, a multi-piece ring gear mounted to a diffuser plate, and a hermetically sealed light source with multiple LEDs where the beam of light emitting from the fixture can be rotated about an axis of the fixture without breaking the hermetic seal.

25 Claims, 11 Drawing Sheets

LUMINAIRE WITH A ROTATING PATTERN BEAM

CROSS-REFERENCE TO RELATED APPLICATION

This application claims benefit under 35 U.S.C. 119(e) to U.S. Provisional Patent App. No. 63/400,342, filed Aug. 23, 2022, the entire disclosure of which is hereby incorporated by reference herein in its entirety. Any and all priority claims identified in the Application Data Sheet, or any corrections thereto, are hereby incorporated by reference under 37 CFR 1.57.

BACKGROUND

Field

This invention relates to lights, and more particularly, relates to outdoor light fixture assemblies.

Description of the Related Art

Luminaires are often used to illuminate outdoor structures or plants. In some cases, a luminaire can have a beam pattern that is not round. In these cases, it can be beneficial to aim the beam of light relative to the luminaire in such a way that the beam of light aligns with a particular feature of a structure or plant or otherwise illuminates an object in an aesthetically pleasing way.

SUMMARY

In some embodiments the luminaire comprises an illuminating light source and a fixture. This invention provides an apparatus and a method for rotating a beam of light relative to a fixture after the fixture is installed.

In some embodiments, the shape of the projected light can be round, square, rectangular, oval, star, or any other shape.

An aspect is directed to a light fixture. The light fixture comprises a diffuser plate, a drive gear, a driven gear mounted to the diffuser plate, and a hermetically sealed light source comprising multiple LEDs and configured to emit a beam of light. The beam of light can be rotated about an axis of the light fixture without breaking the hermetic seal.

Additional aspects further comprise wherein the driven gear is a ring gear.

Additional aspects further comprise wherein the ring gear comprises a plurality of teeth configured to engage with the drive gear.

Additional aspects further comprise wherein the plurality of teeth are disposed on an internal surface of the ring gear.

Additional aspects further comprise wherein the plurality of teeth are disposed on an outer surface of the ring gear.

Additional aspects further comprise wherein the driven gear comprises two or more segments, and wherein the two or more segments are mounted to an outer circumference of the diffuser plate.

Additional aspects further comprise wherein at least one of the two or more segments engages to another one of the two or more segments.

Additional aspects further comprise wherein the sealed light source is configured to emit the beam of light, and wherein the beam of light has a non-symmetrical shape.

Additional aspects further comprise wherein the non-symmetrical shape is oval.

Additional aspects further comprise wherein the diffuser plate has a planar shape.

Additional aspects further comprise a heatsink having a plurality of fins, the heatsink being configured to dissipate heat generated by the hermetically sealed light source.

Additional aspects further comprise a housing configured to be disposed in the heatsink and support the hermetically sealed light source.

Additional aspects further comprise a circuit board, the circuit board being electrically coupled to the hermetically sealed light source.

Additional aspects further comprise a cover lens positioned so that the beam of light passes through the cover lens.

Additional aspects further comprise a plurality of lens aligned with the multiple LEDs.

Additional aspects further comprise wherein the plurality of lens is total internal reflector (TIR) lens.

An aspect is directed to a light fixture. The light fixture comprises a drive gear assembly comprising a first plurality of teeth, a driven gear assembly comprising a second plurality of teeth configured to engage with the first plurality of teeth, and a hermetically sealed light source comprising multiple LEDs and configured to emit a beam of light. The hermetically sealed light source rotating in unison with the driven gear assembly. Rotation of the drive gear assembly causes the beam of light to rotate about an axis of the light fixture without breaking the hermetic seal.

Additional aspects further comprise wherein the drive gear assembly comprises a gear and an operator portion.

Additional aspects further comprise wherein the gear and the operator portion are rotationally locked together.

Additional aspects further comprise wherein the gear and the operator portion are longitudinally locked together.

Additional aspects further comprise wherein the gear and the operator portion comprise a snap lock.

Additional aspects further comprise wherein the operator portion can be selectively disengaged from the gear.

Additional aspects further comprise a seal, the seal being disposed between the gear and the operator portion.

Additional aspects further comprise wherein the operator portion is configured to be rotated by a tool.

Additional aspects further comprise wherein the driven gear assembly comprises a 360-degree ring gear and a diffuser plate, the 360-degree ring gear being coupled to the diffuser plate.

An aspect is directed to a method for making radial adjustments to a light fixture configured to emit a beam of light. The light fixture comprises a drive gear assembly and a driven gear assembly. The method comprises engaging a tool with an operator portion of the drive gear assembly and rotating the operator portion to cause rotation of the driven gear assembly. The rotation of the driven gear assembly causes the beam of light to rotate about an axis of the light fixture.

Additional aspects further comprise wherein the driven gear assembly comprises a ring gear having a first plurality of teeth on an internal surface of the ring gear, wherein the drive gear assembly comprises a gear having a second plurality of teeth on an outer surface of the gear, and wherein rotating the operator portion to cause rotation of the driven gear assembly further rotationally engages the first plurality of teeth with the second plurality of teeth.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will now be described with additional specificity and detail through use of the accompanying drawings.

DETAILED DESCRIPTION

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment(s) herein disclosed.

Figure 1:
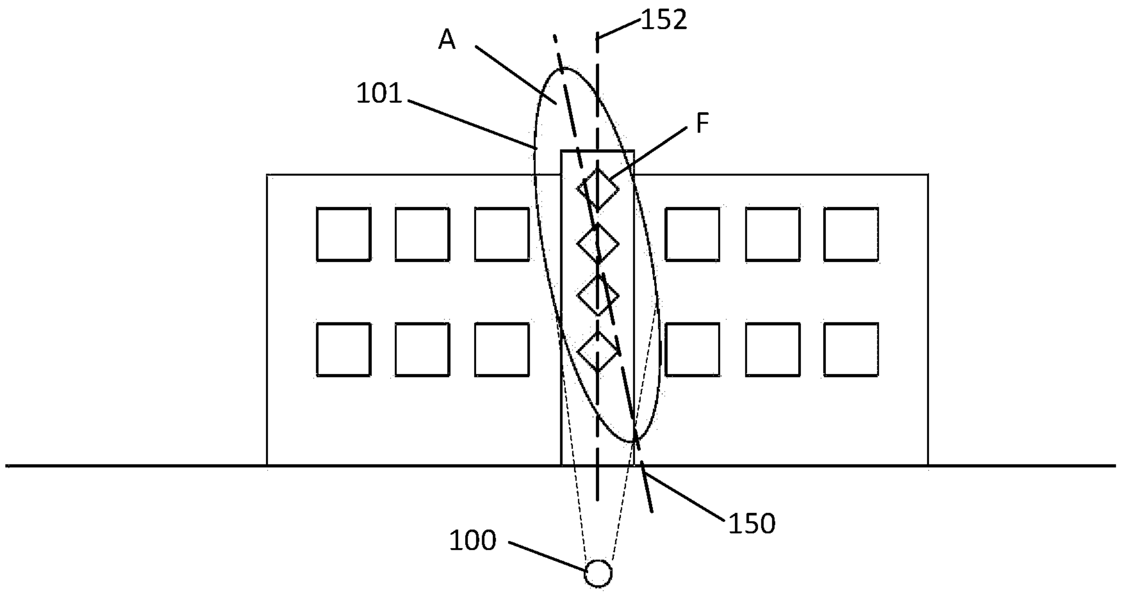
FIG. 1 illustrates an installation of a light fixture according to this disclosure in front of a building with an oval beam. In this illustration, the oval beam has not been aligned to a feature of the building.
Figure 2:
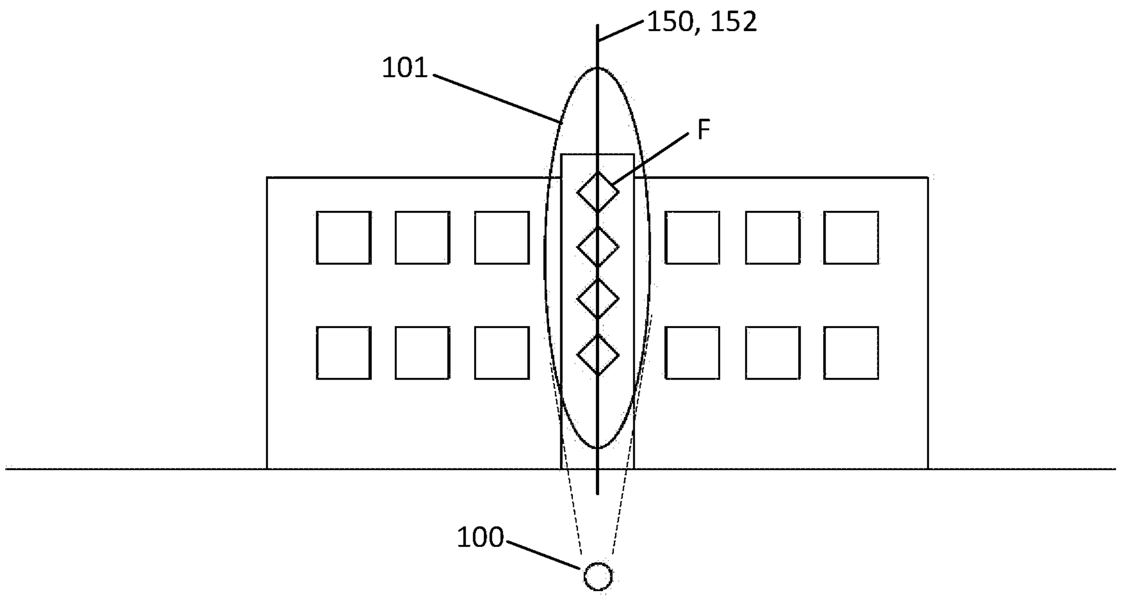
FIG. 2 illustrates the oval beam after being aligned with a desired feature of the building by rotation of a drive gear assembly of the light fixture.

FIG. 1 illustrates an installation of a light fixture 100 according to this disclosure in front of a building with a beam 101 having an oval shape. In other embodiments, the beam 101 can have other shapes (e.g., square, rectangular, elliptical, non-symmetrical, etc.). In this illustration, the oval beam 101 projected onto the building produces an area A of light that has not been aligned to a feature F of the building. For example, the area A includes an elliptical pattern with a major axis 150 that is misaligned with a central vertical axis 152 of the feature F. FIG. 2 illustrates the oval beam 101 after the area A is aligned with the feature F of the building by rotation of a drive gear assembly 134 of the light fixture 100. The drive gear assembly 134 is further described below.

Figure 4:
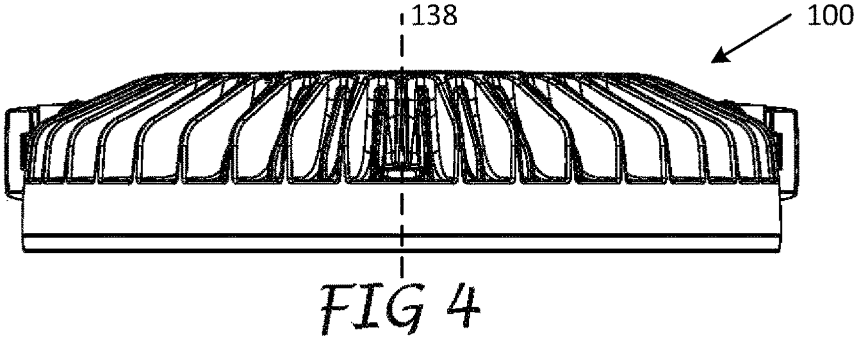
FIG. 4 is a top view of the light fixture from FIG. 3.
Figure 3:
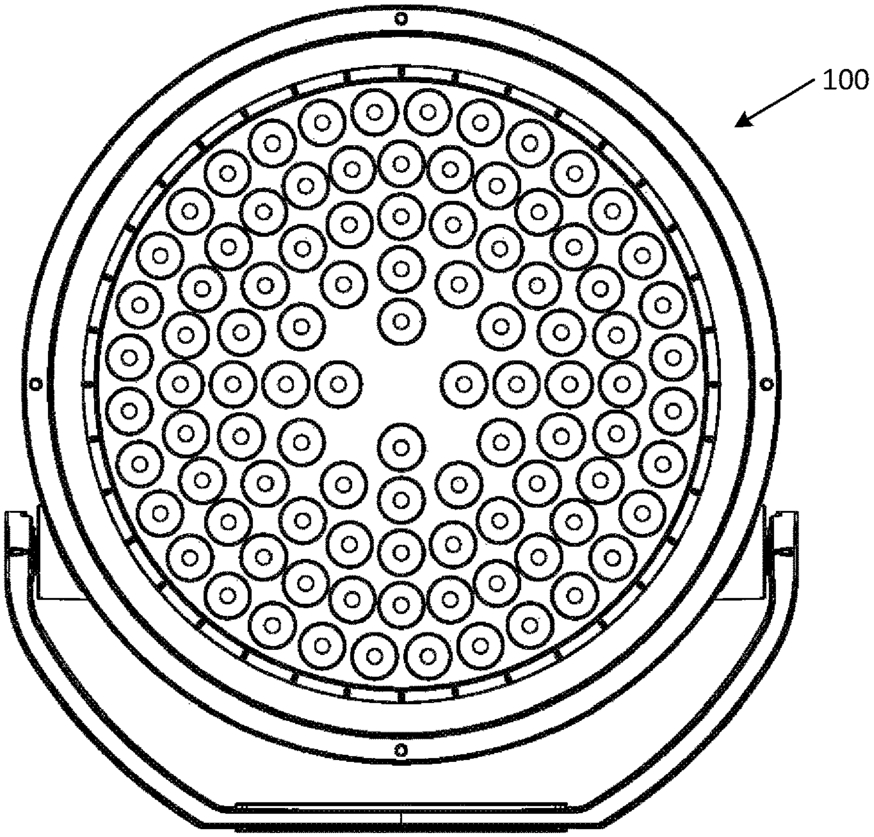
FIG. 3 is a front view of the light fixture from FIGS. 1 and 2. In certain embodiments, the light fixture can comprise one or more of the drive gear assembly, a driven gear assembly mounted to a driven gear mounting plate, and a hermetically sealed light source with multiple LED's where the beam of light emitting from the light fixture can be rotated about an axis of the light fixture without breaking the hermetic seal.
Figure 5:
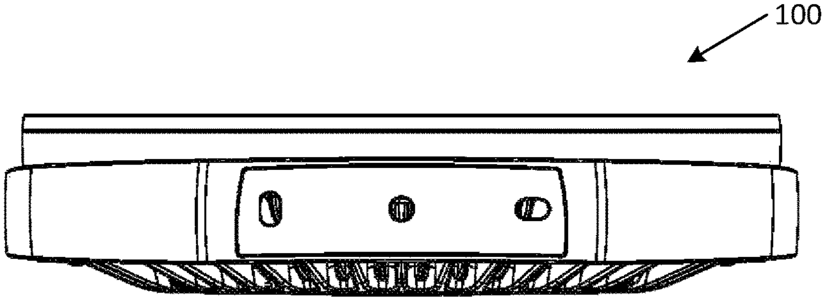
FIG. 5 is a bottom view of the light fixture from FIG. 3.
Figure 17:
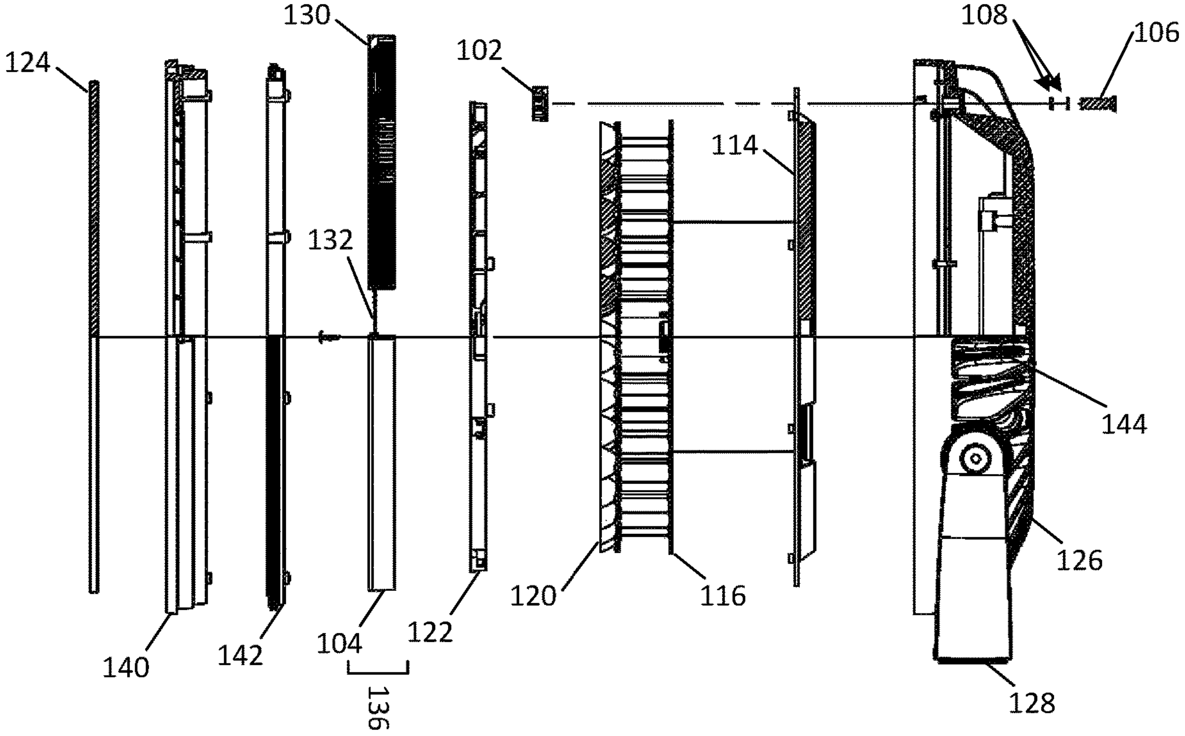
FIG. 17 is an exploded side view of the light fixture from FIG. 3.

FIG. 3 is a front view of the light fixture 100 from FIGS. 1 and 2 and includes the drive gear assembly 134. FIG. 4 is a top view of the light fixture 100 from FIG. 3. FIG. 5 is a bottom view of the light fixture 100 from FIG. 3. In certain embodiments, the light fixture 100 can further comprise a driven gear assembly 136 (FIG. 17). In certain embodiments, rotation of the drive gear assembly 134 causes the driven gear assembly 136 to rotate the beam 101 of the light fixture 100. In certain embodiments, the driven gear assembly 136 is mounted to a diffuser plate 132. The diffuser plate 132 may include one or more features to form the beam 101 into one or more of the other shapes. For example, the diffuser plate 132 may include a transparent or translucent material formed with internal or surface grooves that direct light rays of the beam 101 into a specific pattern to create a desired shape. Although the term "diffuser plate" is used, one skilled in the art would understand that any beam-forming mechanism could be employed to form the beam 101 in a similar fashion and "diffuser plate" is not intended to be limiting.

Figure 6:
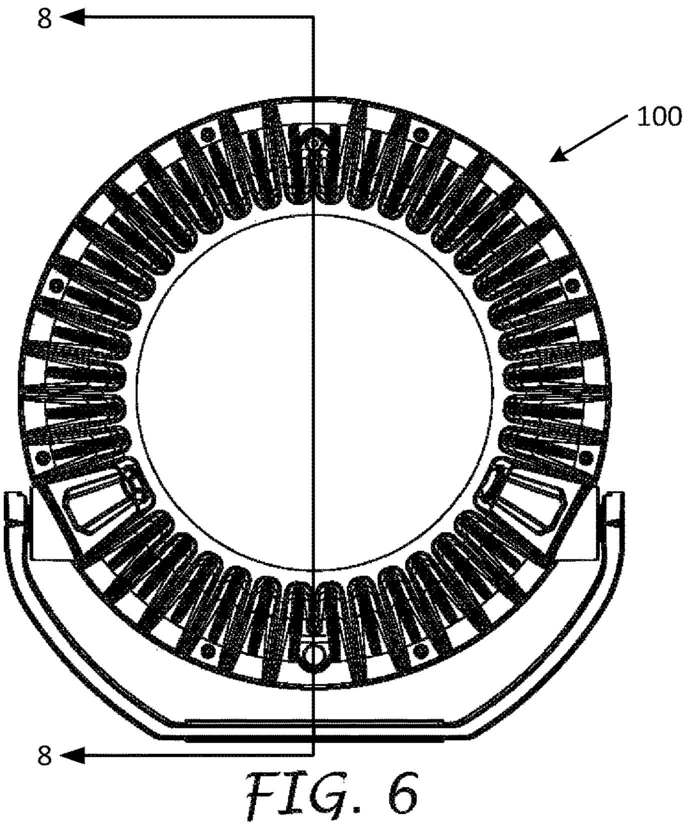
FIG. 6 is a back view of the light fixture from FIG. 3.
Figure 7:
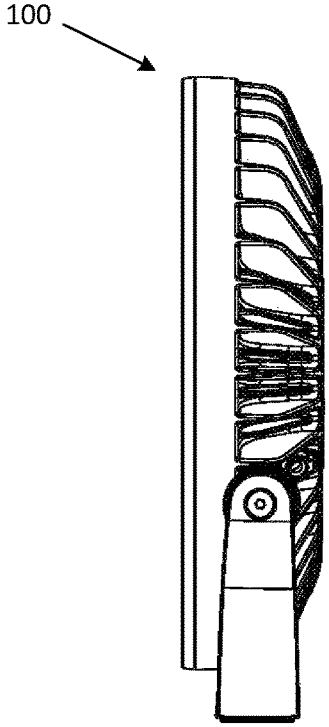
FIG. 7 is a side view of the light fixture from FIG. 3.
Figure 8:
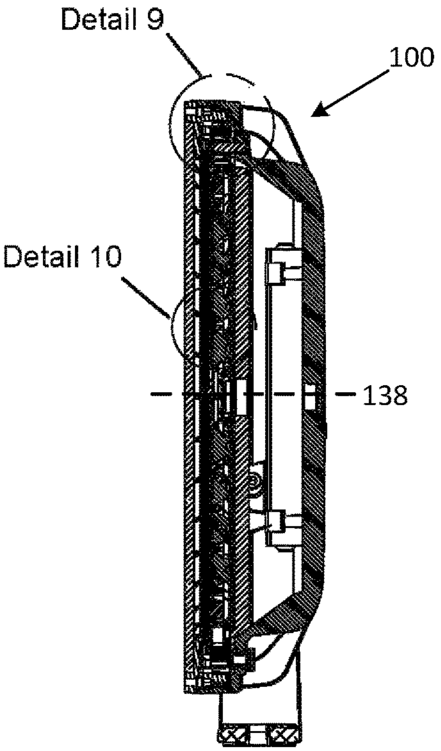
FIG. 8 is a cross-section view along lines 8-8 of FIG. 6.

FIG. 6 is a back view of the light fixture from FIG. 3. FIG. 7 is a side view of the light fixture from FIG. 3. FIG. 8 is a cross-section view along lines 8-8 of FIG. 6. In certain embodiments, the light fixture 100 comprises a sealed light source 118 (e.g., hermetically sealed). For example, in certain embodiments, the light source 118 comprises one or more LEDs or any other type of light source (incandescent, etc.). For example, in certain embodiments, the light source 118 can be an incandescent light. In some cases, the light source 118 can be a halogen light or any other source of light. In the illustrated embodiment, the light fixture 100 comprises a multi-piece drive gear assembly 134, a multi-piece driven gear assembly 136 mounted to a diffuser plate 132, and a hermetically sealed light source 118. In some embodiments, the beam 101 of light emitted from the light fixture 100 can be rotated about an axis 138 of the light fixture 100 without breaking the hermetic seal by rotating the diffuser plate 132 with the gear assemblies 134 and 136. In some embodiments, the light fixture 100 can comprise a locking feature to prevent unwanted rotation.

Figure 9:
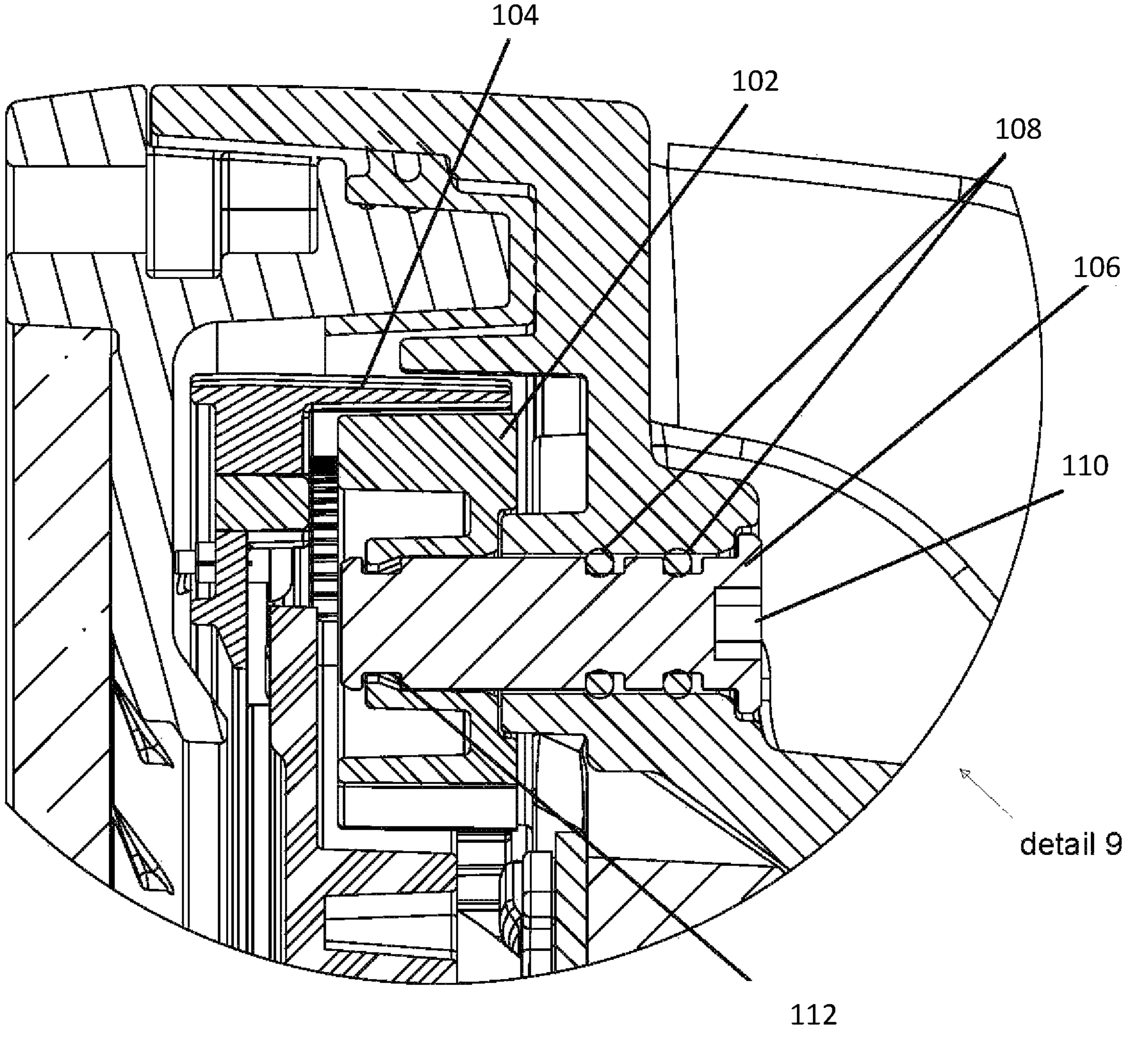
FIG. 9 is a detail view taken from FIG. 8 and shows the drive gear assembly.

FIG. 9 is a detail view taken from FIG. 8 and shows the drive gear assembly 134. In some embodiments, the light fixture 100 can comprise a drive gear 102 and a driven gear 104 to enable the user to make a radial adjustment. In some embodiments, the drive gear 102 is continually engaged with the driven gear 104. In some embodiments, the drive gear 102 is selectively engaged with the driven gear 104. For example, in some embodiments, the drive gear 102 can be engaged with the driven gear 104 when the user needs to make an adjustment. In some cases, the drive gear 102 and the driven gear 104 are disengaged when an adjustment is not being made. In some embodiments, the drive gear 102 and the driven gear 104 each comprise a plurality of teeth 146, 148, respectively.

In some embodiments, the drive gear 102 can be formed to be operated by hand, a tool (e.g., manual or power), a motor, or other similar devices. For example, In some embodiments, the drive gear 102 can be formed to be operated with a tool. In some cases, the drive gear 102 can be formed to receive the tool (e.g., a hex head, socket head, Philips head, torques head, square head, flat head, or any other shape). For example, in certain embodiments, the light fixture 100 comprises an operator portion 106. One or more seals 108 may be used to prevent incursion of air, water, or debris into the light fixture 100 between the operator portion 106 and a sidewall in the heat sink 126 formed to receive it.

In certain embodiments, a user can control rotation of the light fixture 100 by directly rotating the light fixture 100 via, for example, their hand or a hand tool such as a wrench, power tool (e.g., drill, etc.), screw driver, etc. For example, the user can engage an adapter of a drill with the operator portion 106. Once engaged, the user can adjust the rotation clocking of the light fixture 100 via operation of the trigger for the drill. Once in the desired position, the user can remove the drill and lock the clocking of the light fixture 100.

In certain embodiments, the user can control rotation of the light fixture 100 remotely. In certain embodiments, the light fixture 100 can include one or more motors which can be remotely controlled by the user. Exemplary motors include an electric motor which may be a brushed or brushless direct current (DC) motor. For example, the light fixture 100 can include a step motor. In certain embodiments, the user can command the motor to a specific position via a wired or wireless connection. In certain embodiments, the light fixture 100 can include a position sensor configured to provide feedback on the position of the motor. In other embodiments, the light fixture 100 need not include a position sensor and operates in an open-loop configuration.

In certain embodiments, the motor is controlled by a wireless remote control device (smartphone, computer, etc.). For example, in certain embodiments, the wireless remote control device communicates with the light fixture 100 through a bidirectional wireless communication link. In certain embodiments, the wireless remote control device sends commands and receives status information on the operation of the motor. For example, the wireless remote control device can receive input from the user for generating commands that are sent wirelessly to the light fixture 100 to control operation of the motor. In certain embodiments, the display of the wireless remote control device can display real time status information that is received wirelessly from the light fixture 100. Of course, in certain embodiments, the wireless remote control device can simply send commands without receiving status information on the operation of the motor. In certain embodiments, the light fixture 100 comprises a controller configured to receive the wireless commands and generate control signals for operation of the motor.

In certain embodiments, the commands sent to the light fixture 100 are based at least partially on a desired angle or clocking of the beam 101. For example, returning to FIGS. 1 and 2, the user can send a specific command to adjust rotation of the light fixture 100 to illuminate an object in an aesthetically pleasing way. Exemplary commands include a specific number of degrees, radians, etc. In certain embodiments, the commands sent to the light fixture 100 are based at least partially on one or more features of the structure or plant being illuminated. For example, commands can be sent by the wireless remote control device to the light fixture 100 for the motor to align the beam 101 with the central vertical axis 152 of the feature F or any other desirable feature. In this way, the beam 101 can be aligned with the particular feature.

In certain embodiments, the one or more features of the structure or plant to be used for alignment of the beam 101 are identified by the user. For example, the user can identify a feature (location, line, point, etc.) displayed on a smartphone. Once identified, the wireless remote control device can send a command to operate the motor so as to align the beam 101 with the identified feature.

In certain embodiments, the one or more features of the structure or plant to be used for alignment of the beam 101 are auto identified. For example, in certain embodiments, the user inputs a picture of the building to be illuminated (or being illuminated) by the light fixture 100 via a camera device (e.g., smartphone, fixed outdoor camera, etc.). A processor running software (e.g., an app on a smartphone) identifies candidate features. The candidate features can include desirable geometry for aligning the beam 101 (e.g., vertical axis, horizontal axis, specific building feature, etc.). In certain embodiments, the candidate features identified by the software are displayed to the user. The user can select from the displayed features or enter their own feature. In certain embodiments, the software auto selects the feature. Once selected, the wireless remote control device can send a command to operate the motor so as to align the beam 101 with the selected feature.

In certain embodiments, the picture is of the building as it is being illuminated by the light fixture 100. In this embodiment, the software can compare the alignment of a current beam 101 pattern on the building to a more desirable alignment and recommend a clocking adjustment to the user. Once the user selects the recommended clocking adjustment, the wireless remote control device can send a command to operate the motor so as to adjust the beam 101 to the desired alignment.

In certain embodiments, a plurality of desired alignments is identified (user or auto identified) for the light fixture 100. For example, the light fixture 100 can switch between a first desired alignment and a second desired alignment based on, for example, time of day, periodic, weather, user defined, etc.

Figure 20:
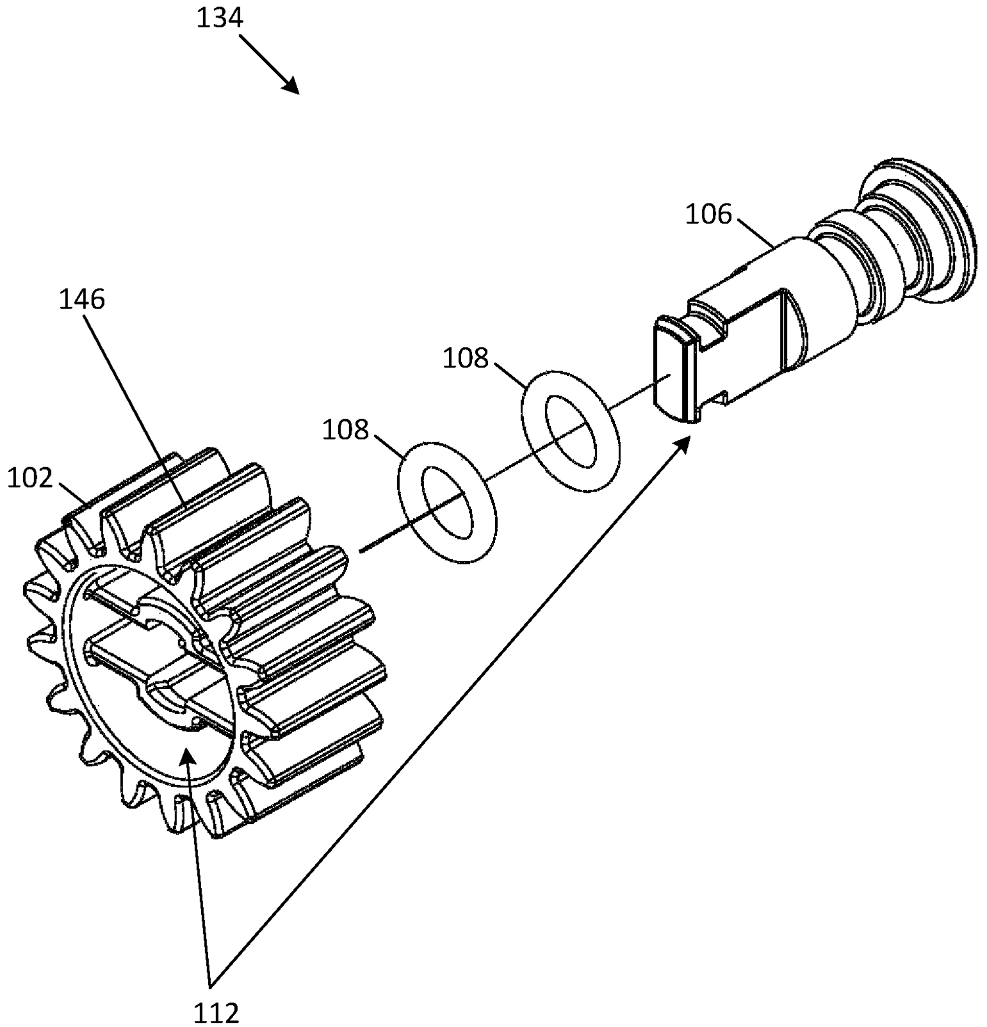
FIG. 20 is an exploded view of the drive gear assembly from FIG. 9.

As is illustrated in FIG. 9, the operator portion 106 can comprises a hole 110 or other receiver structure sized and shaped to be engaged by a tool. In certain embodiments, the drive gear 102 and the operator portion 106 are formed as one unit. In some embodiments, the drive gear 102 and the operator portion 106 are assembled to form the drive gear assembly 134 (see FIG. 20).

In certain embodiments, the drive gear 102 and the operator portion 106 can be joined with features that rotationally lock the two pieces together. In some embodiments, the two pieces can also be locked together in a longitudinal direction. For example, in certain embodiments, a snap lock 112 is employed that prevents the operator portion 106 and the drive gear 102 from being separated during normal operation (see FIG. 20). In other embodiments, the snap lock 112 may be replaced with other methods of fixation such as a threaded shaft on the end of the operator portion 106 receiving the drive gear 102 and a nut (not shown) or mating threaded portion within the drive gear 102. In other embodiments, the operator portion 106 may be disengaged from the drive gear 102 and removed from the light fixture 100 when not in use.

Figure 10:
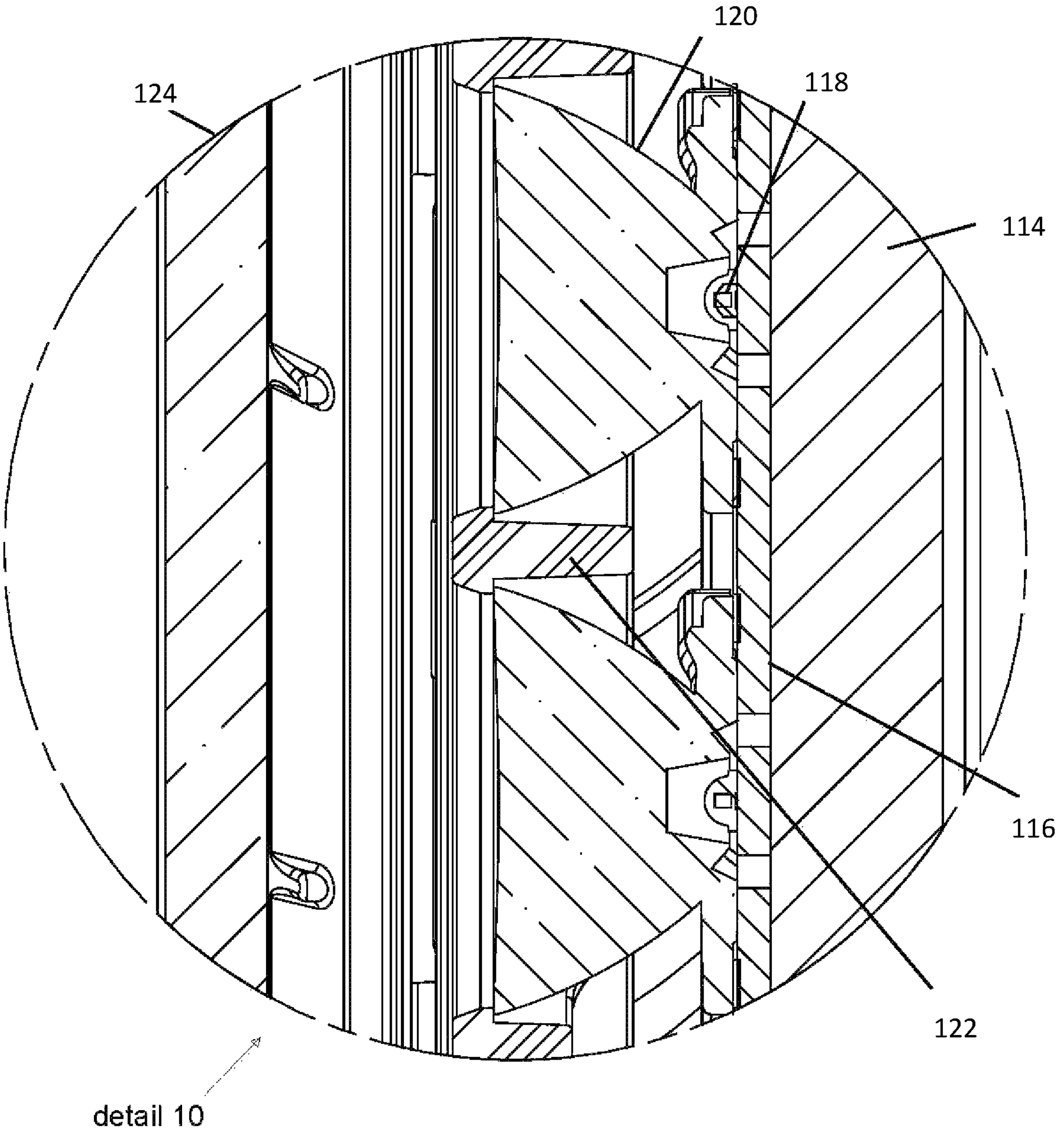
FIG. 10 is a detail view taken from FIG. 8.

FIG. 10 is a detail view taken from FIG. 8. In some embodiments, the shape of the beam 101 can be determined by one or more lenses 120 that cover the light source 118. In some cases, an initial pattern of the beam 101 can be determined by the placement of several light sources 118 within the light fixture 100. In some embodiments, the shape of the beam 101 can be determined by one or more reflective surfaces (e.g., total internal reflector (TIR) lens) of the lens 120. In some cases, a combination of one or more of the lenses 120, multiple light source 118 placement, and one or more of the reflectors of the lens 120 can work in combination to create the initial pattern for the beam 101. The diffuser plate 132 may then further form the beam 101 into a final shape and rotate the shape.

Figure 11:
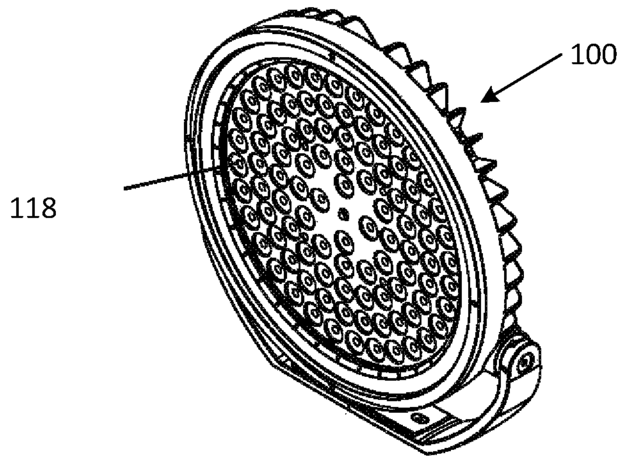
FIG. 11 is a front perspective view of the light fixture from FIG. 3 with a cover lens removed to reveal an array of LED's.
Figure 12:
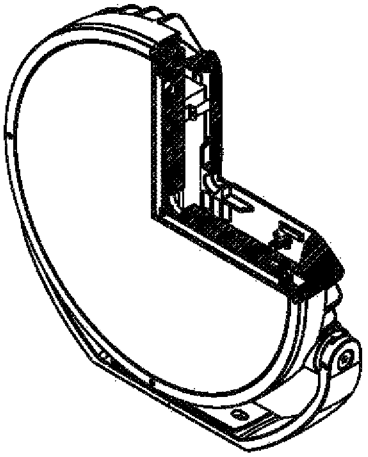
FIG. 12 is a perspective view of the light fixture that is similar to FIG. 11 except the cover lens is installed and a quadrant of the light fixture is cutaway to reveal internal components.
Figure 13:
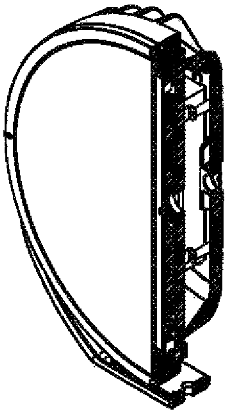
FIG. 13 is another perspective view of the light fixture that is similar to FIG. 11 except the cover lens is installed and a half of the light fixture is cutaway to reveal internal components.

FIG. 11 is a front perspective view of the light fixture 100 from FIG. 3 with a cover lens 124 removed to reveal an array of light sources 118 in the form of LEDs. FIG. 12 is a perspective view of the light fixture 100 that is similar to FIG. 11 except the cover lens 124 is installed and a quadrant of the light fixture 100 is cutaway to reveal internal components. FIG. 13 is another perspective view of the light fixture 100 that is similar to FIG. 11 except the cover lens 124 is installed and a half of the light fixture 100 is cutaway to reveal internal components.

Figure 14:
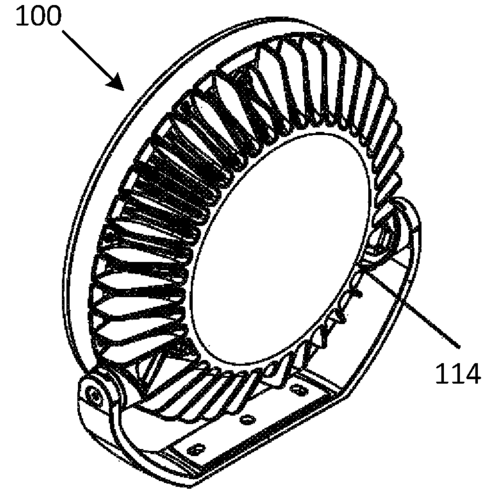
FIG. 14 is a back perspective view of the light fixture from FIG. 3.
Figure 15:
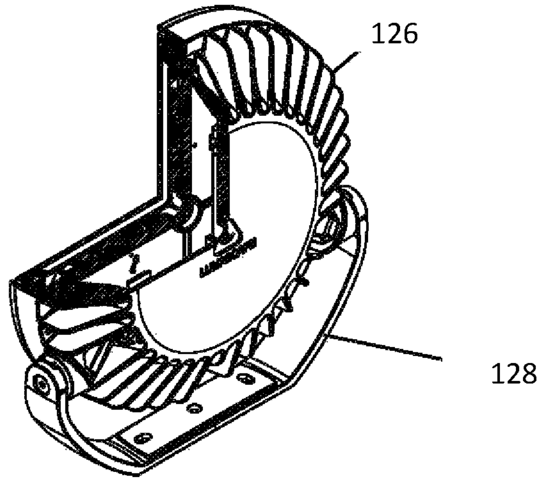
FIG. 15 is a perspective view of the light fixture that is similar to FIG. 14 except a quadrant of the light fixture is cutaway to reveal internal components.

FIG. 14 is a back perspective view of the light fixture 100 from FIG. 3. FIG. 15 is a perspective view of the light fixture 100 that is similar to FIG. 14 except a quadrant of the light fixture 100 is cutaway to reveal internal components. In certain embodiments, the light fixture 100 comprises a mounting bracket 128. The mounting bracket 128 can be configured to allow the user to aim the light fixture 100.

Figure 16:
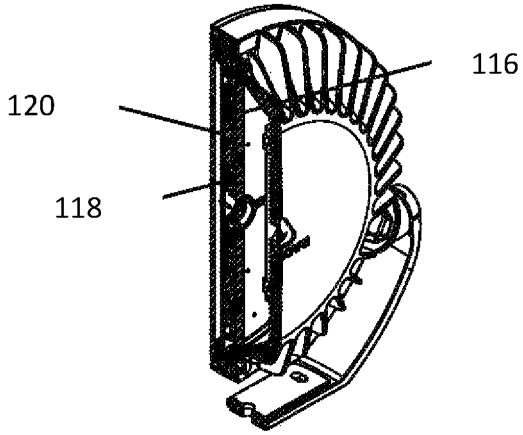
FIG. 16 is another perspective view of the light fixture that is similar to FIG. 14 except a half of the light fixture is cutaway to reveal internal components.

FIG. 16 is another perspective view of the light fixture 100 that is similar to FIG. 14 except a half of the light fixture 100 is cutaway to reveal internal components. In some embodiments, the driven gear 104 can be a ring gear. In some cases, the driven gear 104 can have gear teeth 148 in the internal surface of the ring. In some cases, the driven gear 104 can have gear teeth 148 on the outer surface of the ring.

In some embodiments, the driven gear 104 can be a one-piece gear. In some embodiments, the driven gear 104 can comprise more than one piece. In some embodiments, the driven gear 104 can comprise two, three, four or more segments 130. In some cases, the more than one segment 130 can be connected to each other. In some cases, the multiple segments 130 can be mounted to a diffuser plate 132. In certain embodiments, the multiple segments 130 are mounted to an outer circumference of the diffuser plate 132.

FIG. 17 is an exploded side view of the light fixture 100 from FIG. 3. In certain embodiments, the light fixture 100 comprises a heatsink 126. The heatsink 126 is configured as a passive heat exchanger that transfers the heat generated by the light sources 118 to the surrounding air. The transferred heat is dissipated away from the light fixture 100 lowering the light fixture's temperature. In certain embodiment, the heatsink 118 includes one or more fins 144 to increase the surface area available to transfer heat to the surrounding air.

In certain embodiments, the light fixture 100 comprises a housing 114 configured to be disposed in the heatsink 126 when the light fixture 100 is assembled. The housing 114 supports a circuit board 116 which is electrically coupled to the one or more light sources 118. In certain embodiments, the shape of the beam 101 can be determined by the one or more lenses 120 that cover the light sources 118. The operator portion 106 of the drive gear 102 may extend through a portion of the housing 114 such as a notch or other section to reach the driven gear 104. As the operator rotates the operator portion 106, the teeth 146 of the drive gear 102 engage the teeth 148 of the driven gear 104 and rotate the attached diffuser plate 132. An outer circumferential surface of the driven gear 104 may be supported by an interior surface of the heat sink 126, enabling the assembly including the driven gear 106 and the diffuser plate 132 to rotate smoothly.

In certain embodiments, the light fixture 100 comprises a cover lens holder 140 and a ring seal 142. In certain embodiments, the cover lens holder 140 supports the cover lens 124 when the cover lens 124 is assembled to the light fixture 100 with the ring seal 142 providing a sealing surface between the cover holder 140 and the heat sink 126.

Figure 18:
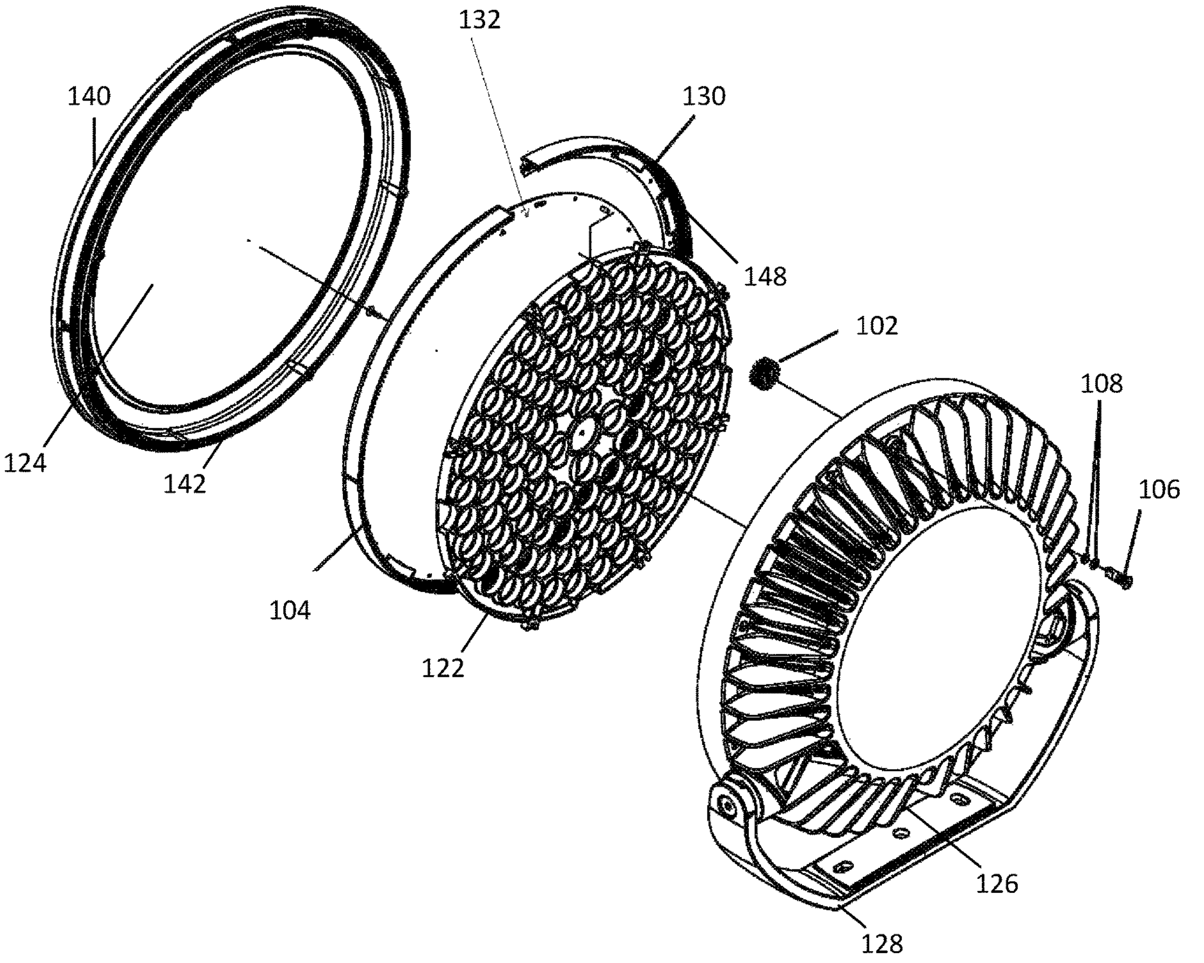
FIG. 18 is an exploded perspective back view of the light fixture from FIG. 17 except the housing, the circuit board, and the lenses have been removed to more clearly show the lens retainer.

FIG. 18 is an exploded perspective back view of the light fixture 100 from FIG. 17 except the housing 114, the circuit board 116, and the lenses 120 have been removed to more clearly show a lens retainer 122. In certain embodiments, the lens retainer 122 is configured to support the one or more lens 120.

Figure 19:
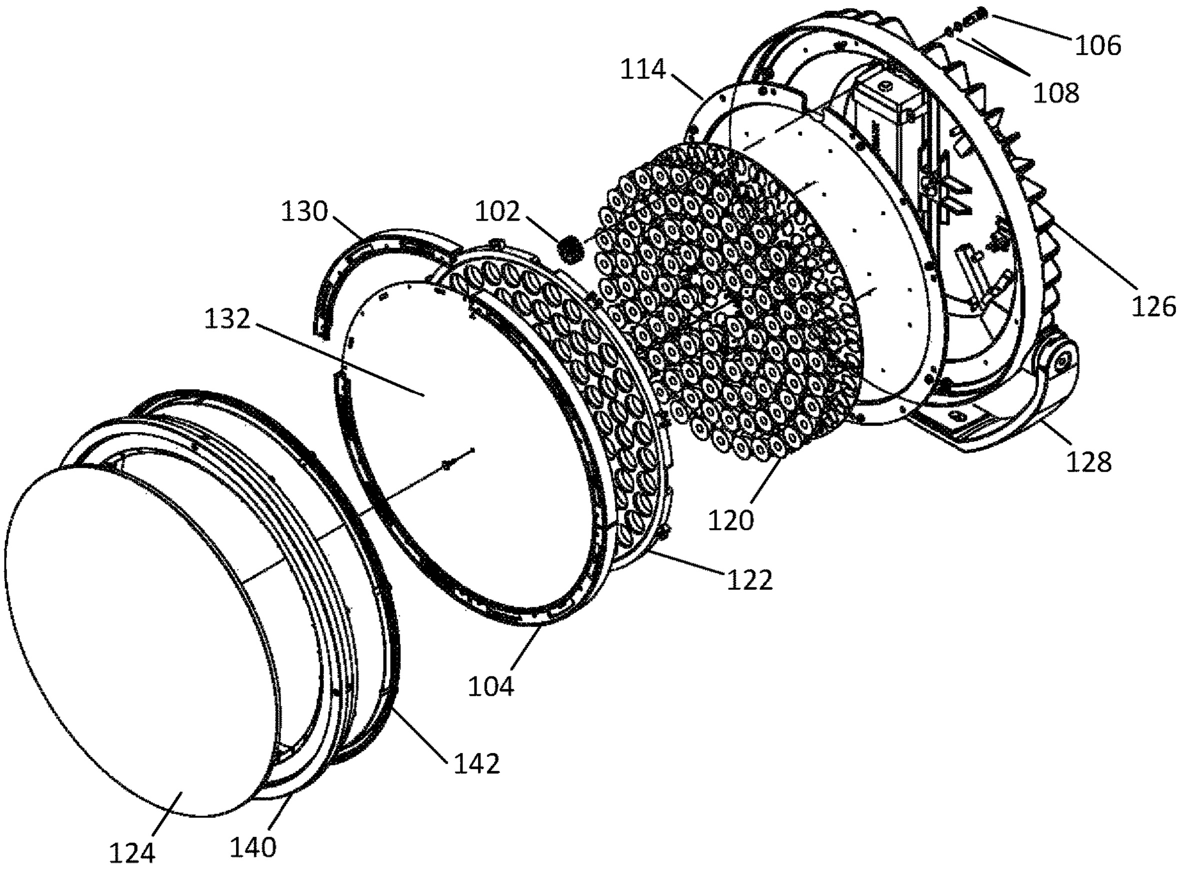
FIG. 19 is an exploded perspective front view of the light fixture from FIG. 3.

FIG. 19 is an exploded perspective front view of the light fixture from FIG. 3. As is illustrated in FIGS. 17-19, the driven gear 104 can comprise multiple pieces that are mounted to a diffuser plate 132 in certain embodiments. In some embodiments, the driven gear 104 can be a 360-degree continuous ring gear. In some embodiments the driven gear 104 can be less than 360 degrees. In some embodiments, the driven gear 104 can have one or more stops to limit the amount of rotation in one or more directions.

In some embodiments, it can be beneficial to manufacture the light fixture 100 in such a way that the light source 118 is sealed from the outdoor elements. In some embodiments, a combination of at least two of the housing 114, the light source 118, reflectors of the lens 120, and the lenses 120 can be hermetically sealed with the seals 108 and 142. Keeping the light fixture 100 that creates the shaped beam 101 hermetically sealed can reduce moisture inside the light fixture 100 which can cause fogging, condensation, or possible electronic failure. In some embodiments, the rotating beam 101 adjustment mechanism (e.g., drive gear assembly 134 and the driven gear assembly 136) disclosed herein can be incorporated into the light fixture 100 to allow the beam 101 to be aimed as desired without disturbing the hermetically sealed light fixture 100. In some embodiments, the hermetically sealed light fixture 100 can be filed with an inert gas, or any low moisture content gas. In some embodiments, the area inside of the hermetically sealed light fixture 100 can be a vacuum. In some embodiments, the area inside of the hermetically sealed light fixture 100 can be pressurized.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it covers all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A light fixture comprising:

a diffuser plate;

a drive gear mounted off-center from the diffuser plate;

a driven gear mounted to the diffuser plate; and a light source hermetically sealed within a housing, the light source comprising multiple LEDs and being configured to emit a beam of light, wherein the drive gear is accessible from outside the hermetically sealed housing, and wherein the driven gear is enclosed within the hermetically sealed housing such that the hermetic seal of the housing remains fixed and intact while the diffuser plate rotates the beam of light in unison with the driven gear.

2. The light fixture of claim 1, wherein the driven gear is a ring gear.

3. The light fixture of claim 2, wherein the ring gear comprises a plurality of teeth configured to engage with the drive gear.

4. The light fixture of claim 3, wherein the plurality of teeth are disposed on an internal surface of the ring gear.

5. The light fixture of claim 3, wherein the plurality of teeth are disposed on an outer surface of the ring gear.

6. The light fixture of claim 1, wherein the driven gear comprises two or more segments, and wherein the two or more segments are mounted to an outer circumference of the diffuser plate.

7. The light fixture of claim 6, wherein at least one of the two or more segments engages to another one of the two or more segments.

8. The light fixture of claim 1, wherein the sealed light source is configured to emit the beam of light, and wherein the beam of light has a non-symmetrical shape.

9. The light fixture of claim 8, wherein the non-symmetrical shape is oval.

10. The light fixture of claim 1, wherein the diffuser plate has a planar shape.

11. The light fixture of claim 1, wherein the housing comprises a heatsink having a plurality of fins, the heatsink being configured to dissipate heat generated by the hermetically sealed light source.

12. The light fixture of claim 11, further comprising another housing configured to be disposed in the heatsink and support the hermetically sealed light source.

13. The light fixture of claim 1, further comprising a circuit board, the circuit board being electrically coupled to the hermetically sealed light source.

14. The light fixture of claim 1, further comprising a cover lens positioned so that the beam of light passes through the cover lens.

15. The light fixture of claim 1, further comprising a plurality of lens aligned with the multiple LEDs.

16. The light fixture of claim 15, wherein the plurality of lens is total internal reflector (TIR) lens.

17. A light fixture comprising:

a drive gear assembly comprising a gear having a first plurality of teeth;

a driven gear assembly comprising a second plurality of teeth configured to engage with the first plurality of teeth; and a light source hermetically sealed within a housing, the light source comprising multiple LEDs and being configured to emit a beam of light, wherein the gear is mounted off-center from the driven gear assembly, wherein the gear is accessible from outside the hermetically sealed housing, and wherein the driven gear assembly is enclosed within the hermetically sealed housing such that the hermetic seal of the housing remains fixed and intact while the beam of light rotates in unison with the driven gear.

18. The light fixture of claim 17, wherein the drive gear assembly further comprises an operator portion.

19. The light fixture of claim 18, wherein the gear and the operator portion are rotationally locked together.

20. The light fixture of claim 18, wherein the gear and the operator portion are longitudinally locked together.

21. The light fixture of claim 18, wherein the gear and the operator portion comprise a snap lock.

22. The light fixture of claim 18, wherein the operator portion can be selectively disengaged from the gear.

23. The light fixture of claim 18, further comprising a seal, the seal being disposed between the gear and the operator portion.

24. The light fixture of claim 18, wherein the operator portion is configured to be rotated by a tool.

25. The light fixture of claim 17, wherein the driven gear assembly comprises a 360-degree ring gear and a mounting plate, the 360-degree ring gear being coupled to the mounting plate.

* * * * *